H. W. SCHATZ.
VARIABLE SPEED MECHANISM.
APPLICATION FILED SEPT. 11, 1909.
971,219.
Patented Sept. 27, 1910.
2 SHEETS—SHEET 1.
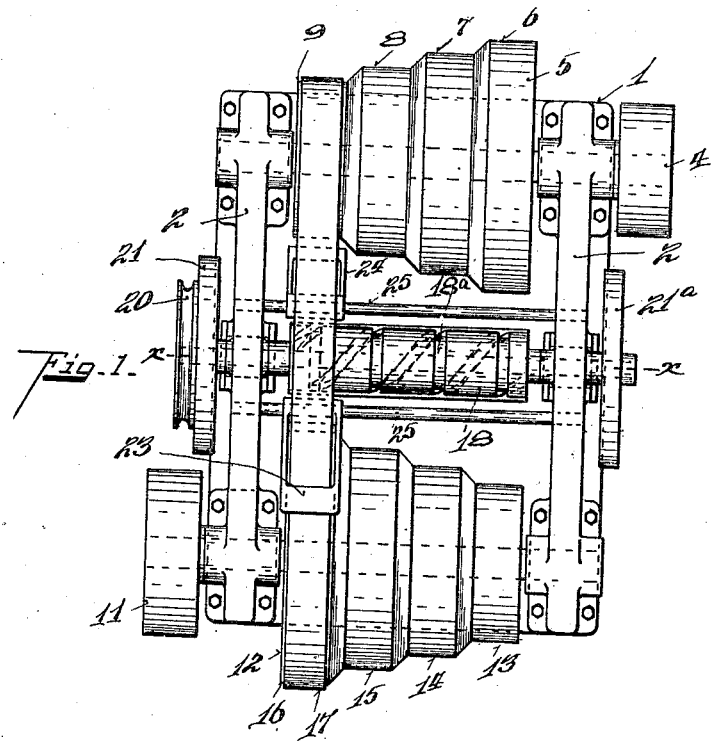
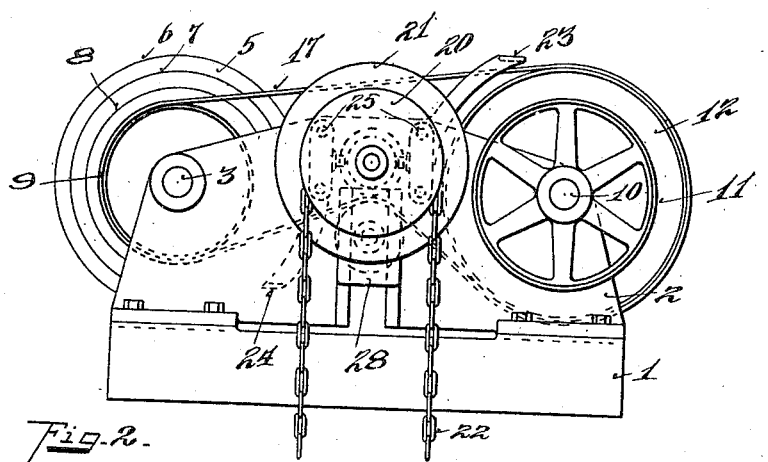

H. W. SCHATZ.
VARIABLE SPEED MECHANISM.
APPLICATION FILED SEPT. 11, 1909.
971,219.
Patented Sept. 27, 1910.
2 SHEETS—SHEET 2.
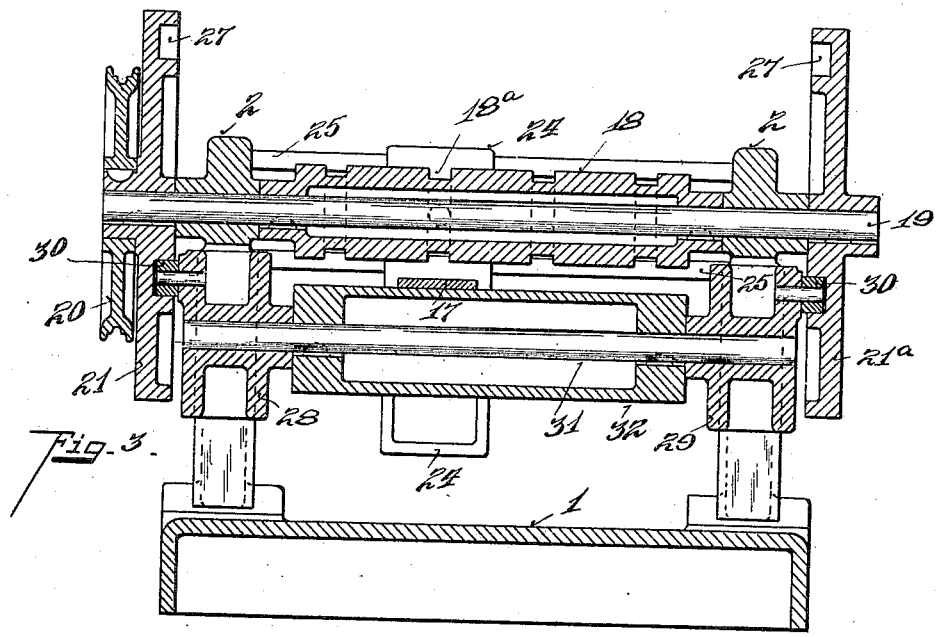
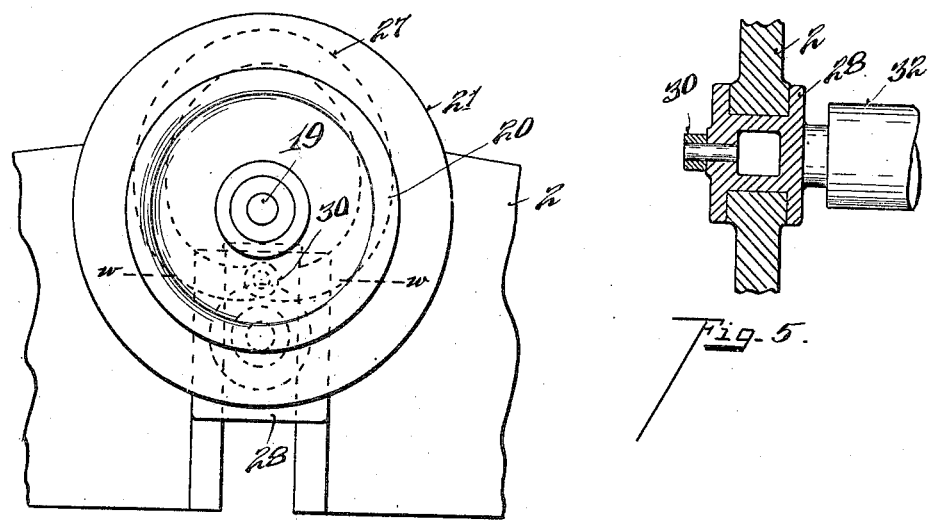

UNITED STATES PATENT OFFICE.

HERMAN W. SCHATZ, OF CINCINNATI, OHIO, ASSIGNOR TO THE AMERICAN TOOL WORKS COMPANY, OF CINCINNATI, OHIO, A CORPORATION OF OHIO.

VARIABLE-SPEED MECHANISM.

971,219. Specification of Letters Patent. Patented Sept. 27, 1910.

Application filed September 11, 1909. Serial No. 517,314.

*To all whom it may concern:*

Be it known that I, HERMAN W. SCHATZ, a citizen of the United States, residing at Cincinnati, in the county of Hamilton and State of Ohio, have invented certain new and useful Improvements in Variable-Speed Mechanism, of which the following is a specification.

My invention relates to variable speed device primarily of that type employing a pair of step-pulleys and connecting belt.

One of the objects of my invention is to provide means for shifting the belt from one step to another, with means for automatically governing the tension of the belt relative to the pulleys, so as to release the same to effect the change and tighten the same after the belt has been shifted from one step to another.

Another object of my invention is to provide a variable speed device employing a pair of step-pulleys, a pair of belt-shifters, with means for actuating one shifter in advance of the second, and means engaging the belt for releasing or tightening the tension relatively with the step-pulley surfaces, automatically controlled and actuated during the shifting of the belt from one transmitting position to a second.

Another object of my invention is to provide a variable speed device of the step-pulley and belt type, employing a pair of belt shifting means, and an irregularly grooved cam for shifting the belt shifter, with means in combination therewith comprising an elongated roll, adapted to engage the belt intermediate of the pulleys, for increasing or decreasing the tension relatively therewith before and after each belt shifting operation, with the belt shifting means and belt tension mechanism, actuated by the same manipulating means.

The features of my invention are more fully set forth in the description of the accompanying drawings, forming a part of this specification, in which:—

Figure 1 is a top plan view of my variable speed device. Fig. 2 is a side elevation thereof. Fig. 3 is an enlarged section on line *x*, *x*, Fig. 1. Fig. 4 is an enlarged end elevation of a cam for actuating the belt tension roll. Fig. 5 is a section on line *w*, *w*, Fig. 4.

1 represents the base having the bearing brackets 2 fixed upon the ends thereof. 3 represents the driving shaft journaled in bearings formed in the brackets 2, and 4 represents the driving pulley fixed to the shaft 3. Said shaft 3 is provided with a step-pulley 5, and, as illustrated, is provided with four steps, 6, 7, 8, and 9, of varying diameters, relative to each other.

10 represents a driven shaft mounted in the bearings formed in the supports 2, and 11 represents a driven pulley fixed to said shaft.

12 represents a step-pulley fixed to shaft 10, provided with different diameter steps, 13, 14, 15, and 16, oppositely disposed and relatively alined with the steps of pulley 5.

17 represents a belt for transmitting power from the step-pulley 5 to the step-pulley 12. This belt is shifted laterally from one step of the pair of step-pulleys 5 and 12, to another, by the following instrumentalities:— 18 represents a grooved cam fixed upon a shaft 19, journaled in the brackets 2, the groove formed on said cam being an irregular spiral, and in its path from one end of the cam to the other, is one-half annular and the other half helical around the periphery of the cam. 20 represents a chain-wheel fixed to a sleeve projection formed on the cam-wheel 21, said cam-wheel being in turn fixed to the shaft 19. 22 represents a chain for rotating the chain-wheel 20 from a distant point. 23, 24 represent belt shifters, each slidably mounted upon rods 25 carried by the supports 2. Each belt-shifter is provided with a stud carrying a roller projecting into the groove of the cam 18. These rolls or rollers carried by the shifters are oppositely disposed to each other, whereby the one roller will travel in the annular portion of the groove 18ª, while the opposite roller travels in the angular or helical portion of the groove, thereby laterally shifting one belt-shifter at a time in changing the belt from one step to another, one belt-shifter remaining idle while the other is moved. It is desirable to loosen the frictional tension between the belt and step-pulleys in shifting the belt, and again to tighten the same, after the desired change has been made, and this belt controlling means I accomplish automatically at each revolution of the chain wheel, which action likewise completes the shifting of the belt from one step to the second.

21 and 21$^a$ represent cam wheels fixed on the shaft 19, each provided with a cam groove 27 upon one side thereof. 28 and 29 represent slides slidably mounted upon ways formed in the supports 2, each slide carrying a roller 30, traveling in the cam grooves 27, of their respective cams 21 and 21$^a$. The cam-wheels 21 and 21$^a$ being fixed to the shaft with the cam grooves relatively alined with respect to each other, so as to simultaneously actuate the slides 28 and 29, in a direction to and from the belt.

31 represents a shaft journaled in the slides 28 and 29, carrying a belt-tightening roller 32 fixed thereon. Said roller is preferably made elongated so as to adapt the same to engage the belt in any of its step positions, governed by the number of steps contained in the step-pulley.

*Mode of operation.*—To effect the change of speed between the driving pulley 4 and the driven pulley 11, the chain-wheel 20 is rotated, which action will revolve the grooved cam 18, shifting one shifter to a second position by riding within the inclined surface of the groove 18$^a$, while the opposite shifter remains stationary, and this action is brought about upon one-half revolution of the grooved cam 18, and a complete revolution thereof causes the opposite shifter to travel within the inclined portion of the groove while the first named shifter travels in the annular portion of the groove 18$^a$, thereby remaining in a stationary position. In shifting the belt from one step to another the belt tightener roller 32, through the cam action of wheels 21 and 21$^a$, is moved away from the belt, loosening its driving tension with the step-pulleys, until the belt has been shifted, when the position of cam-groove 27 is such as to bring the same again into contact with the belt for tightening the same.

As the belt shifting mechanism is illustrated it requires one revolution of the chain-wheel to make a complete change.

Having described my invention, I claim:—

1. In a variable speed device a pair of shafts, a step-pulley fixed to each shaft, a belt for transmitting motion between such pulleys, a pair of belt-shifters slidably mounted for shifting the belt laterally, a rotatable cylindrical cam having a groove partly annular and partly helical, means carried by said shifters engaging into said groove, a belt tightening roller intermediate of said pulleys, and means for moving said roller to and from the belt during a belt-shifting operation, in driven connection with said cam.

2. A variable speed device, having a pair of step-pulleys and transmitting belt, a pair of belt-shifters, one adjacent to each step-pulley, means for shifting said shifters one in advance of the other, and means in connection with said belt-shifting means for releasing and tightening the tension of the belt.

3. A variable speed device, having a pair of step pulleys and transmitting belt, means for shifting the belt from one step to another, and means for governing the tension of said belt in connection with said belt shifting means to release the tension prior to a belt shifting operation and again apply the tension thereafter.

4. A variable speed device, having a pair of step pulleys and transmitting belt, a belt shifter for each pulley, means for actuating said belt shifters one in advance of the other, an elongated belt tightener roller intermediate of said pulleys in connection with said belt actuating means for shifting said roller to release and tighten the tension of the belt.

5. A variable speed device, having a pair of step pulleys, and transmitting belt, a pair of belt shifters, means for actuating one shifter in advance of the second, and means actuated by said belt shifting means for releasing and tightening the tension of the belt relatively during a belt shifting operation.

6. In a variable speed device, a pair of shafts, a step pulley fixed to each shaft, a belt for transmitting motion between such pulleys, a pair of belt shifters slidably mounted for shifting the belt laterally, a rotatable cylindrical cam having a groove partly annular and partly helical, means oppositely disposed carried by said shifters engaging into said groove for shifting one shifter in advance of the other, an elongated vertically movable roller interposed between said pulleys adapted to engage said belt for governing the tension thereof, and cam mechanism in driving connection with said cylindrical cam and in connection with said roller for releasing and tightening the tension of the belt during each belt shifting operation.

7. A variable speed device, having a pair of step pulleys and transmitting belt, a pair of belt shifters, means for actuating one shifter in advance of the second, means adapted to engage said belt intermediate of said pulleys, and cam mechanism interposed between said shifter actuating means and belt engaging means for simultaneous control thereof, whereby the tension of the belt is released prior to a belt shifting operation and again applied thereafter.

8. A variable speed device having a pair of step pulleys and transmitting belt, a pair of belt shifters, means for actuating one shifter in advance of the second, and movable means engaging said belt in connection with said belt shifter means and actuated thereby for governing the tension of the belt before and after each belt shifting operation.

In testimony whereof, I have hereunto set my hand.

HERMAN W. SCHATZ.

Witnesses:
   OLIVER B. KAISER,
   LUISE BECK.